Figure 1:
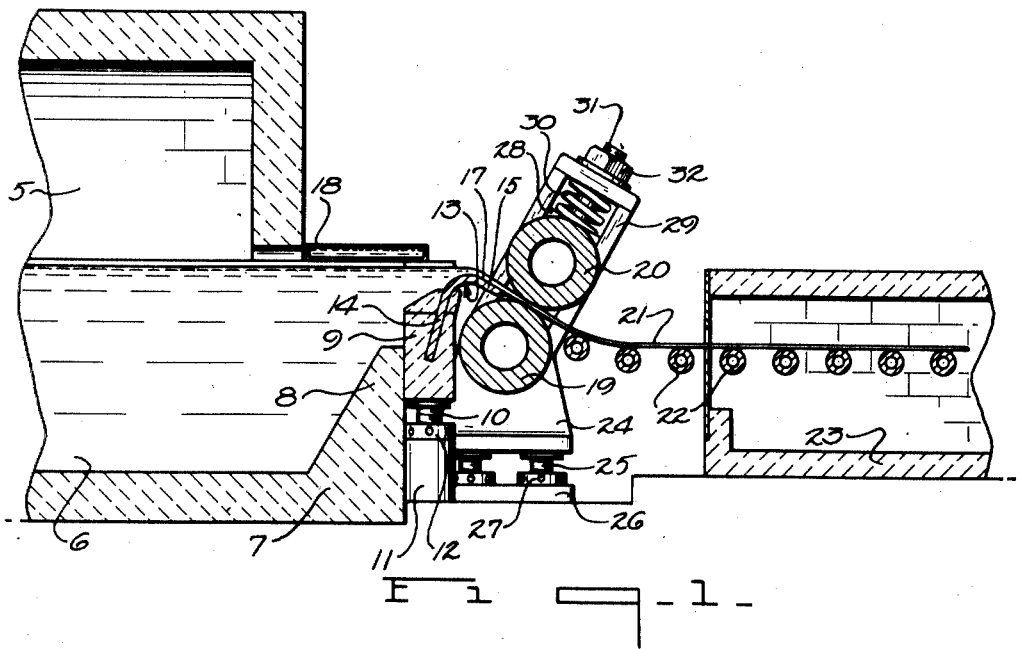

Feb. 16, 1932.　　　J. L. DRAKE　　　1,845,909
GLASS APPARATUS
Filed March 7, 1930

Inventor
John L. Drake
By Frank Fraser
Attorney

Patented Feb. 16, 1932

1,845,909

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

GLASS APPARATUS

Application filed March 7, 1930. Serial No. 433,977.

This invention relates broadly to the art of glass manufacture and more particularly to an improved furnace construction from which molten glass is delivered to suitable sheet or other glassware forming mechanism.

Heretofore, in the construction of glass melting furnaces adapted for supplying molten glass to sheet glass forming mechanism, it has been customary for certain types of these furnaces to be provided at one end with an overflow lip over which the glass is passed to the sheet forming means. The overflow lips in the past have ordinarily been constructed of a refractory clay material with the result that there was a tendency for the molten glass flowing thereover to stick thereto and that after a time this glass adhering to said lip would become devitrified and form so-called dog-metal which was obviously objectionable since it had a tendency to injuriously effect the quality of glass passing to the forming mechanism and, in addition, necessitated periodic cleaning of the overflow lip to remove the devitrified glass therefrom. Also, the refractory clay lip would gradually wear away causing lines and other defects in the glass.

The aim of the present invention is to overcome these objectionable features by the provision of a furnace having an overflow lip constructed of a non-corrosive metal and in heating this lip preferably by the passage of an electric current therethrough. With such a construction, the molten glass will be permitted to slide or flow freely over the lip to the sheet forming mechanism and there will be no tendency for the glass to stick or adhere thereto and become hardened or devitrified. This will result in the delivery of glass of a greatly improved quality to the forming means and as the lip will always remain free of adherent glass, it will not be necessary for the said lip to be periodically scraped or cleaned.

Another object of the invention consists in so associating the metallic lip member with the front wall of the furnace that it will also function to minimize the formation of devitrified glass and dog-metal in close proximity thereto.

A further object of the invention is the provision of a furnace, the end wall of which consists of a stationary portion and a vertically movable portion, the vertically movable portion carrying the metallic lip member partially embedded therein, together with means for raising and lowering the movable wall portion and lip member as a unit to control the flow of glass from the furnace over the latter.

Other objects and advantages of the invention will become more apparent during the course of the following description when taken in connection with the accompanying drawings.

Figure 2:
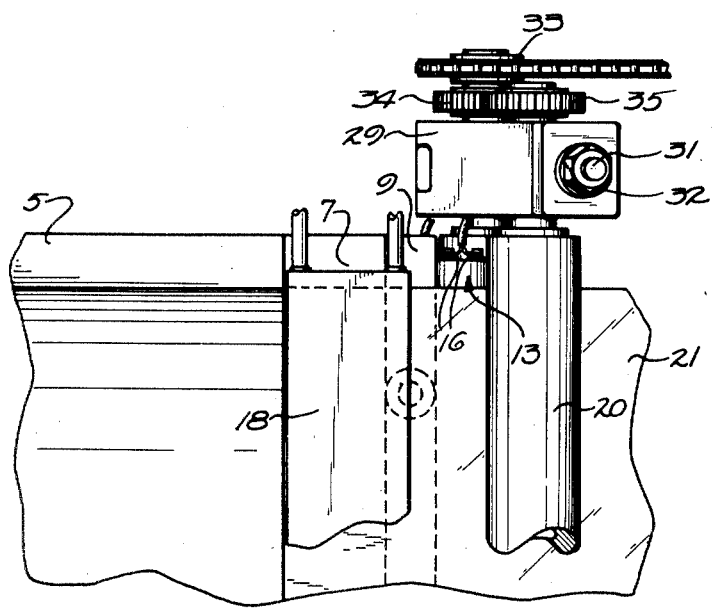

In the drawings forming a part of this application and wherein like numerals are employed to designate like parts throughout the same, Fig. 1 is a longitudinal vertical section through apparatus constructed in accordance with the present invention, and Fig. 2 is a plan view of a portion thereof.

Referring to the drawings, the numeral 5 designates the furnace proper of any suitable construction and within which is adapted to be produced a mass of molten glass 6. The furnace 5 is provided at one end with a fore-hearth 7 projecting forwardly thereof and being open at its upper end. The front wall of the fore-hearth consists of a stationary portion 8 and a vertically movable portion 9 arranged outwardly thereof, said movable portion being supported upon jackscrews 10 received within members 11 and adjustable by means of the nuts 12 threaded thereupon.

The numeral 13 designates the metallic lip member in its entirety and which comprises a substantially vertically disposed portion 14 embedded within the movable wall portion 9 and also a forwardly directed portion 15 which preferably inclines slightly downwardly as shown. The metal lip member is preferably formed of a suitable non-corrosive material such as monel, michrome etc., and is adapted to be heated preferably by the passage of an electric current therethrough. This current may be conducted to the lip member through a plurality of wires 16 connected to one end thereof and conducted therefrom by similar wires leading from the opposite end.

The glass is adapted to flow over the lip member in a relatively thin stream 17 which is, however, of a thickness relatively greater than the final thickness of sheet to be produced. A horizontal cooler 18 can be arranged above the molten glass in the forehearth and closely adjacent thereto to assist in conditioning the upper surface thereof and in controlling the viscosity of the glass stream. Arranged in opposition to the lip member 13 are the substantially superposed forming rolls 19 and 20, said rolls being slightly inclined from the horizontal and in substantial alignment with the inclined portion 15 of the lip member. The stream of molten glass 17 flowing over the lip is passed between the forming rolls and reduced thereby to a sheet 21 of substantially predetermined and uniform thickness, said sheet being supported and carried along upon a plurality of rolls 22 into and through an annealing leer 23.

The lower forming roll 19 is journaled at each end in a bracket 24 supported upon jack-screws 25 received within members 26 and adjustable vertically by nuts 27 threaded thereupon. The upper forming roll 20 is journaled at each end within a bearing member 28 slidably mounted within a guideway 29 carried by or formed integral with bracket 24 so that the upper roll can be moved to and from the lower roll. The upper roll is normally urged toward the lower roll by means of a compression spring 30 at each end thereof, said compression spring bearing at one end against the top of the guideway 29 and at its opposite end against the bearing member 28. The bearing member at each end of roll 20 carries a bolt 31 passing upwardly through the top of bracket 29 and having a nut 32 threaded thereupon. The compression springs, while yieldably urging the rolls toward one another, are of such a nature that the rolls can be readily moved apart to permit the passage of clay or other foreign matter therebetween. The movement of roll 20 toward roll 19 is limited by adjustment of the nuts 32 upon bolts 31. In other words, the compression springs will force the roll 20 toward the roll 19 as far as the adjustment of the nuts 32 upon bolts 31 will permit.

By heating the lip member 13 in the manner above described, the stream of molten glass 17 will be permitted to flow or slide freely thereover and there will be no tendency for the glass to stick or adhere thereto with the result that the lip will always remain clean and the objectionable features pointed out above incident to the use of refractory clay lips avoided. Also, the molten glass delivered to the forming rolls will be of a greatly improved quality. Furthermore, by heating the portion 14 of the lip member which is embedded within the movable wall portion 9, this wall portion will also be heated to the extent that it will prevent the molten glass contacting therewith and in close proximity thereto from becoming chilled and eventually devitrified. Likewise, a portion of this heat will be transmitted through the stationary wall portion 8 to prevent chilling of the glass adjacent thereto. Upon rotation of the nuts 12, the wall portion 9 and lip member 13 can be adjusted vertically as a unit to control the thickness of the stream 17 flowing over the latter.

One of the forming rolls and, as here shown, the roll 19, is preferably positively driven such as through a sprocket and chain drive 33 and the other roll driven from the first roll through the intermeshing gears 34 and 35 carried by the roll shafts.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A furnace containing a mass of molten glass and having a front wall including a vertically movable refractory portion, a metallic lip member carried thereby and over which the molten glass is adapted to flow, said lip member having a substantially vertically disposed portion embedded within said movable wall portion and another portion projecting forwardly therefrom, and means for electrically heating said metallic lip member.

2. A furnace containing a mass of molten glass and having a front wall including a vertically movable refractory portion, a metallic lip member carried thereby and over which the molten glass is adapted to flow, said lip member having a substantially vertically disposed portion embedded within said movable wall portion and another portion projecting forwardly therefrom, and means for passing an electric current through said metallic lip member.

3. A furnace containing a mass of molten glass and having a front wall including a stationary refractory portion and a vertically movable refractory portion arranged outwardly of said stationary portion and projecting thereabove, a metallic lip member carried by said movable portion and over which the molten glass is adapted to flow, said lip member having a substantially vertically disposed portion embedded within said movable wall portion and another portion projecting forwardly therefrom, and means for passing an electric current through said metallic lip member for heating the glass flowing thereover and for also heating the movable wall portion and the molten glass in proximity thereto.

Signed at Toledo, in the county of Lucas and State of Ohio, this 5th day of March, 1930.

JOHN L. DRAKE.